(12) United States Patent
Yang et al.

(10) Patent No.: US 8,202,596 B2
(45) Date of Patent: Jun. 19, 2012

(54) STANDING SEAM PROFILE FOR THERMOPLASTIC ROOF ORNAMENTATION

(75) Inventors: Li-Ying Yang, Whippany, NJ (US); Thomas J. Taylor, Wayne, NJ (US); Sudhir Railkar, Wayne, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 89 days.

(21) Appl. No.: 12/651,315

(22) Filed: Dec. 31, 2009

(65) Prior Publication Data

US 2011/0159224 A1 Jun. 30, 2011

(51) Int. Cl.
*B32B 9/00* (2006.01)
*B32B 33/00* (2006.01)
*E04H 12/00* (2006.01)
*E04C 5/16* (2006.01)

(52) U.S. Cl. .......... 428/40.1; 52/108; 52/302.1; 52/638; 52/680

(58) Field of Classification Search .................. 428/40.1, 428/42.1; 52/41, 57, 73, 97, 98, 101, 108, 52/146, 300, 302.1, 637, 638, 680
See application file for complete search history.

(56) References Cited

U.S. PATENT DOCUMENTS

| | | | |
|---|---|---|---|
| 4,440,588 A | 4/1984 | Stevenson et al. | |
| 4,605,578 A | 8/1986 | Emrich et al. | |
| 5,126,003 A | 6/1992 | Hassmann et al. | |
| 5,409,189 A * | 4/1995 | Luhmann | 248/205.3 |
| 5,729,944 A | 3/1998 | De Zen | |
| 6,554,947 B2 | 4/2003 | Pfotenhauer et al. | |
| 7,448,582 B2 * | 11/2008 | Jackson | 248/215 |
| 2002/0170254 A1 | 11/2002 | Ritland et al. | |
| 2009/0169803 A1 | 7/2009 | Halahmi et al. | |

OTHER PUBLICATIONS

PCT/US2010/062423, Search Report and Written Opinion of the International Searching Authority mailed Mar. 10, 2011.
PCT/US2010/062425, Search Report and Written Opinion of the International Searching Authority mailed Mar. 10, 2011.

* cited by examiner

*Primary Examiner* — Patricia Nordmeyer
(74) *Attorney, Agent, or Firm* — Baker & McKenzie LLP

(57) ABSTRACT

In accordance with the disclosed principles, a novel thermoplastic profile roofing strip and an apparatus for welding the thermoplastic profile roofing strip to a thermoplastic roofing membrane is disclosed. In one embodiment, the thermoplastic profile roofing strip may comprise a horizontal base extending longitudinally and having a notched profile. In addition, the thermoplastic profile strip may comprise a vertical central portion laterally connected at one edge and normal to the horizontal base. In such embodiments, the vertical central portion extends longitudinally along the horizontal base to provide the improved profile. Related methods of welding a thermoplastic strip to a thermoplastic membrane are also disclosed.

12 Claims, 2 Drawing Sheets

_US 8,202,596 B2_

STANDING SEAM PROFILE FOR THERMOPLASTIC ROOF ORNAMENTATION

TECHNICAL FIELD

In accordance with the disclosed principles, a decorative roof profile and a method for attaching same to thermoplastic roofing membranes, more particularly welding a thermoplastic decorative profile to a thermoplastic single ply membrane is disclosed.

BACKGROUND

Thermoplastic roofing membranes, such as polyvinyl chloride (PVC) and thermoplastic polyolefin (TPO), are rapidly growing in market acceptance. However, even though they can be made in a wide variety of colors, they do not impart a good aesthetic appearance to a roof surface. In contrast, metal roofing has regular, parallel standing seams that join each sheet of metal. These seams, together with colored metal coatings, provide for an attractive roofing surface. In fact, metal roofing is frequently used as a decorative and functional roof surface for small commercial and public building roof sections that are visible from the street. Some plastic profile systems are available for attachment to thermoplastic roofing membranes, such that a metal roof-like appearance can be obtained. These profile systems are sometimes described as standing seam profiles (SSP).

To duplicate this appearance, thermoplastic strips have been secured to the thermoplastic membranes, sometimes by adhesive, and sometimes by the application of heat, all of which is done manually. An example of an adhesive system is a butyl peel and stick tape. Adhesive systems may require the roof membrane be primed prior to attachment, with difficulty being priming the exact area of attachment. Primer that extends onto the roofing membrane may be visible and discolor the membrane. Another disadvantage of adhesively attached profiles is that adhesive systems may not be as robust for the 20 to 30 year life expectancy of the roof system as compared to a permanent attachment method.

Applying heat to permanently attach the profiles may require a welder that is large and cumbersome. For a steep sloped roof, this is especially challenging. Also, the roofer will be required to guide the system in a straight line to achieve a good appearance, while keeping the profile in place, and maintaining a balance on a sloped roof.

Unfortunately, manual application of the strips is a time consuming and labor intensive process, increasing the cost of the roofing and decreasing the cost advantage gained by selecting thermoplastic roofing over metal roofing. Manual application also increases opportunity for error and is not conducive to creating straight and/or parallel and/or equidistant lines. What is needed in the art is a quick and inexpensive apparatus and method of attaching thermoplastic strips to thermoplastic roofing membranes.

SUMMARY

Embodiments of the invention provide a thermoplastic profile strip and a welding apparatus for permanently attaching the profile strip to a thermoplastic roofing material. In addition, methods for welding a thermoplastic profile strip to a thermoplastic membrane are also disclosed.

In one aspect, an improved thermoplastic profile strip is disclosed. In one embodiment of such a strip, the thermoplastic profile roofing strip may comprise a horizontal base extending longitudinally and having a notched profile. In addition, the thermoplastic profile strip may comprise a vertical central portion laterally connected at one edge and normal to the horizontal base. In such embodiments, the vertical central portion extends longitudinally along the horizontal base to provide the improved profile.

In another aspect, an apparatus for welding a thermoplastic profile strip to a thermoplastic membrane is provided. In one embodiment, such an apparatus may comprise a first nozzle capable of directing hot air onto an upper surface of a first edge of a thermoplastic profile strip, and a second nozzle capable of directing hot air onto an upper surface of a second edge of a thermoplastic profile strip. In addition, in such an embodiment, the apparatus may also comprise a tubular splitter capable of simultaneously supplying hot air to the first nozzle and the second nozzle. In more specific embodiments, the first and second nozzles each comprise a first portion for supplying hot air and a second portion configured to apply downward pressure on upper surfaces of the strip that have received hot air.

In yet another aspect, methods for welding a thermoplastic profile strip to a thermoplastic membrane are provided. In one embodiment, such a method may comprise placing a thermoplastic profile roofing strip onto a thermoplastic roofing membrane. Such a thermoplastic profile roofing strip may include a horizontal base extending longitudinally having a notched profile, and a vertical central portion laterally connected along one edge to the horizontal base, wherein the vertical central portion extends longitudinally along the horizontal base. In such an embodiment, the method may also include applying an apparatus for welding a thermoplastic profile strip to a thermoplastic roofing membrane. The method may then comprise splitting a supply of hot air to first and second nozzles, and simultaneously directing hot air onto upper surfaces of a first and second lips of the thermoplastic profile strip using the first and second nozzles. In addition, the method could then comprise advancing the apparatus along the length of the thermoplastic profile strip such that the first and second nozzles simultaneously supply the split hot air along the length of the thermoplastic profile strip.

BRIEF DESCRIPTION OF THE DRAWINGS

FIG. 3B is a detailed view of embodiments of the nozzle tips of FIG. 3A conjoined for use with the welding apparatus of FIG. 2.

DETAILED DESCRIPTION

Figure 1:
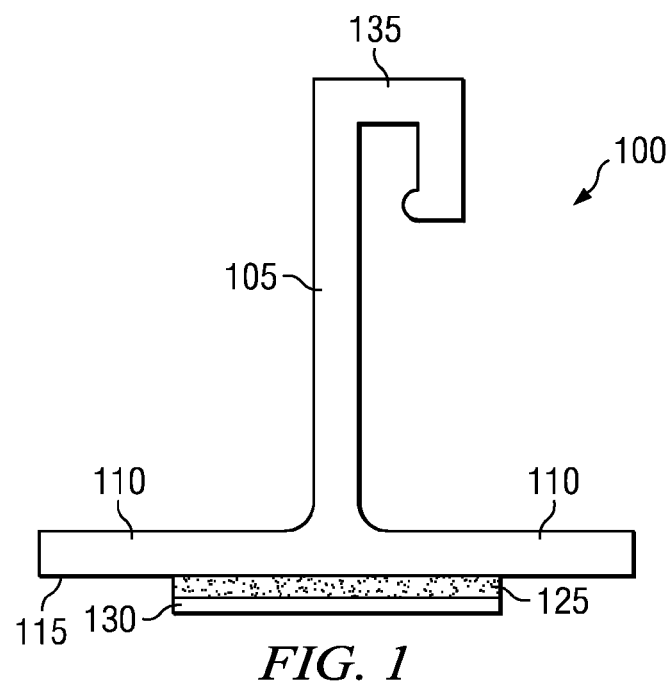
FIG. 1 is a cross-sectional view of a thermoplastic profile strip to be welded to a thermoplastic roofing membrane.

A thermoplastic profile strip 100 as shown in FIG. 1. The profile strip 100 may be attached to a thermoplastic roofing membrane in accordance with the disclosed principles. The thermoplastic profile strip 100 is preferably produced as an integrally formed seamless thermoplastic object. Methods of production of the thermoplastic profile strip 100 may include extrusion, molding, etc. The thermoplastic profile strip 100 preferably includes an upstanding central portion 105 extending lengthwise along the strip and opposed flange portions 110 extending widthwise from the central portion 105. In some embodiments, the opposed flange portions 110 extend from the central portion 105 in the range from about 0.5 inch to about 1 inch, and in a preferred embodiment may be about ⅝ inch. The opposed flange portions 110 length may depend on the height of the upstanding central portion 105 that needs to be supported.

In some embodiments, the upstanding central portion 105 height ranges from about 1 inch to about 3 inches, more preferably from about 2 inches to about 2.5 inches. In a preferred embodiment, the upstanding central portion 105 height is 1.25 inches. Opposite the upstanding central portion 105 and the opposed flange portions 110 is a bottom surface 115. In a preferred embodiment, the bottom surface 115 is about ¾ inch. In alternate embodiments, the bottom surface 115 may range from about ⅛ inch to about 1 inch. In some embodiments, the bottom surface 115 may be coated with an adhesive. In some embodiments, the bottom surface 115 may be coated with a pressure sensitive adhesive and 125 a release liner 130. In some embodiments, the adhesive 125 may be, but not limited to, butyl rubber adhesive and the release liner 130 may be, but not limited to, siliconized paper.

The upper portion of the upstanding central portion 105 includes an integral hook 135. In a preferred embodiment, the hook 135 has a cross section similar to an upside down U. In an alternate embodiment, the hook 135 may also include a lip. In alternate embodiments, the hook 135 may be any cross sectional shape capable of being a guide or used with a lock as described below.

Figure 2:
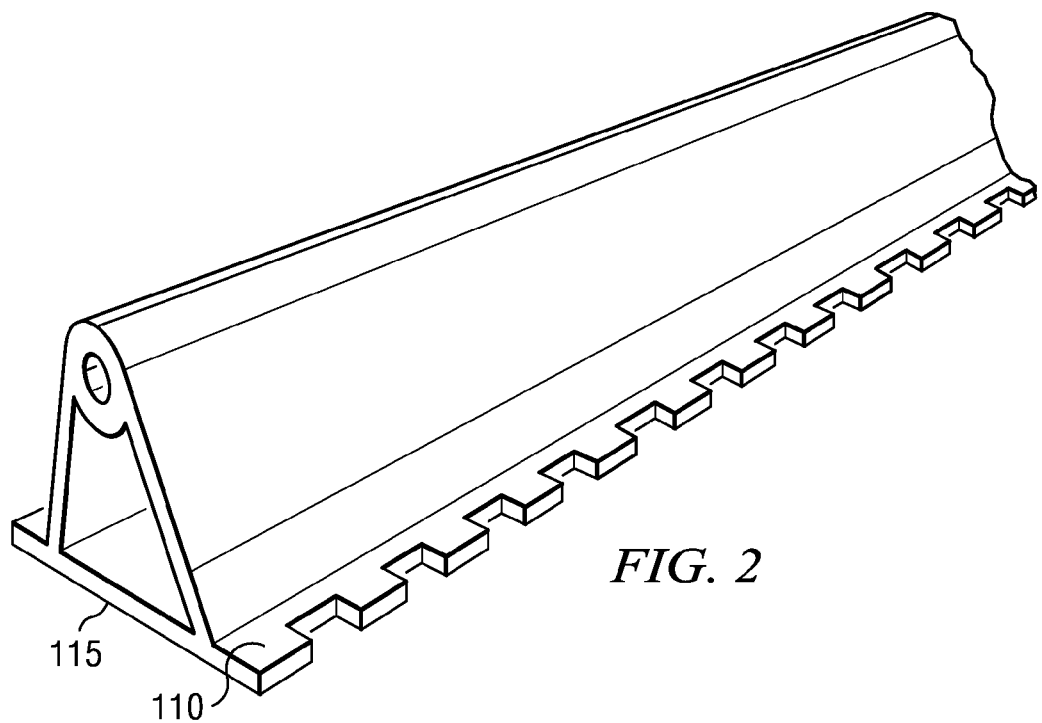
FIG. 2 is a perspective view of an alternate embodiment of a thermoplastic profile strip.

In an alternate embodiment, the thermoplastic profile strip 100 may have a triangular cross-sectional shape as seen in FIG. 2. The opposed flange portions 110 may include a notched profile. The profile would extend along the length of both of the opposed flange portions 110. The notched profile may be any shape, such as a square tooth (as shown) or saw toothed and the like. During continuous welding, the notched profile may enable the teeth to be heated along with sections of the thermoplastic roofing membrane. The welder foot may then "smear" the teeth out over the heated thermoplastic roofing membrane ensuring a good weld.

Figure 3A:
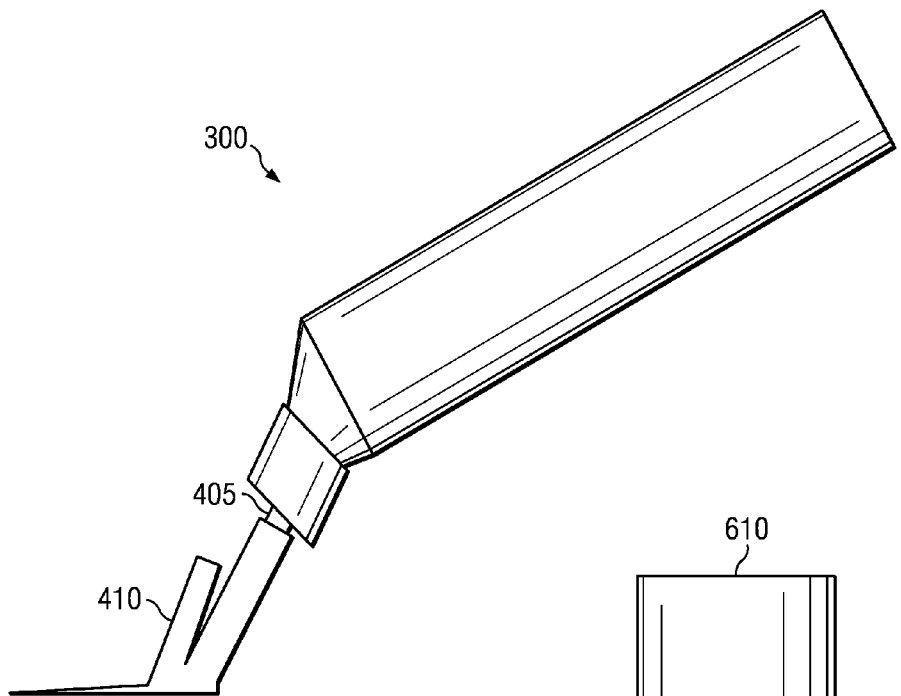
FIG. 3A is a side view of a welder attachment for attaching a thermoplastic profile strip to a thermoplastic roofing membrane.
Figure 3B:
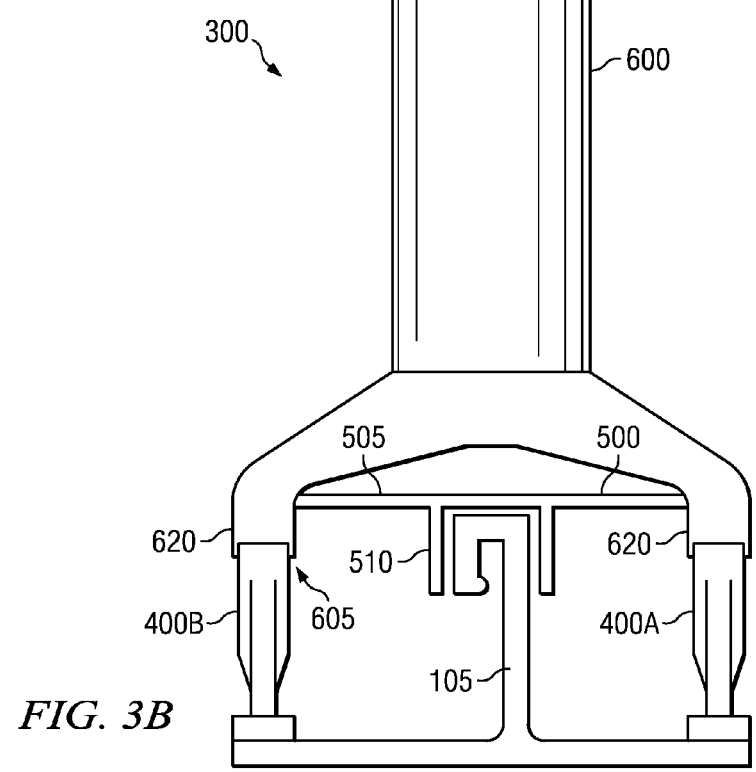
FIG. 3B is a front view of the welder attachment of FIG. 3A.

Embodiments of an apparatus 300 for welding the thermoplastic profile strip 100 to the thermoplastic roofing membrane are shown in FIGS. 3A-3B. Like numerals are used across the figures to describe similar parts of the apparatus 300. In a preferred embodiment, the apparatus 300 includes a first nozzle 400A, a second nozzle 400B, a platform guiding device 500, and a splitter 600. In addition, other embodiments of a welding apparatus that may be employed with the profile strips of the present disclosure may be found in co-pending U.S. application Ser. No. 12/651,331, which was filed the same day as the present disclosure, and is commonly owned with the present disclosure and incorporated herein by reference in its entirety.

FIG. 3A is a side view of the apparatus 300 and FIG. 3B is a front view of the apparatus 300 connected to the first nozzle 400A and the second nozzle 400B. In a preferred embodiment, the first nozzle 400A and the second nozzle 400B are identical and only the first nozzle 400A will be described. The splitter 600 supplies hot air to the first nozzle 400A and the second nozzle 400B. The splitter 600 includes an inlet 610 and a plurality of outlets 620. In a preferred embodiment, the splitter 600 is fabricated from pipe components, i.e., fittings. In an alternate embodiment, the splitter 600 is an integrally fabricated piping component. The sizing of the splitter 600 including the inlet 610 and the plurality of outlets 620 will be dependent on the sizing of the first nozzle 400A and the second nozzle 400B, which will be sized dependent on the thermoplastic profile strip 100. The splitter 600 will be connected to a hot air supply (not shown), preferably a hot air gun. In an alternate embodiment, the apparatus 300 may only include a first nozzle 400A.

The first nozzle 400A includes an inlet 405 and a tip 410. The inlet 405 will be connected to one of the outlets 620 of the splitter 600. The tip 410 includes an outlet for delivering a hot air stream to the edge of the opposed flange portions 110. In an alternate embodiment, the tip 410 is shaped to be placed on the notched profile of the opposed flange portions 110. The cross section of the first tip 410 is preferably shaped to provide an even flow of hot air across the notched profile. Moreover, the elongated pointed profile of the tip 410 allows heat to be applied from a back portion of the tip 410, while the front end of the tip 410 continues to apply downward pressure to the welding area as the tip 410 is moved along the profile strip 100.

As shown in FIG. 3B, the platform guiding device 500 is capable of moving the splitter 600, first nozzle 400A, second nozzle 400B along the length of the upstanding central portion 105 of the thermoplastic profile strip 100. In some embodiments, the platform guiding device 500 may be self-propelled while in other embodiments the platform guiding device 500 may be manually propelled by an operator. In a preferred embodiment, the platform guiding device 500 includes a platform 505 and a guide 510. In a preferred embodiment, the platform 505 is capable of supporting the hot air supply and associated parts. The platform 505 may be shaped and sized by one of skill in the art to support the platform 505, the guide 510, and associated parts.

To ensure the hot air and pressure are applied to the welding area, the guide 510 travels along the upstanding central portion 105 of the thermoplastic profile strip 100. In a preferred embodiment, the guide 510 is an upside down U in cross section sized to be placed over the thermoplastic profile strip 100, preferably the hook 135. The guide 510 may also include a guide roller. In some embodiments, the guide roller is sized to control the elevation of the platform guiding device 300. In some embodiments, the guide roller is a silicon roller. In alternate embodiments, the guide roller may be made of any hard rubber with a smooth surface. In some embodiments, the guide 510 also includes a locking device. The locking device is shaped and sized to connect with the hook 135 of the thermoplastic profile strip 100. In some embodiments, the locking device is a movable platform having a first position for providing access to place the guide 510 on the upstanding central portion 105 and a second position to place the movable platform in contact with the hook 135 of the thermoplastic profile strip 100. In alternate embodiments, the guide 510 has a cross section for mounting on the cross sectional profile of the thermoplastic profile strip 100.

Before the thermoplastic profile strip 100 is welded to the thermoplastic roofing membrane, the thermoplastic profile strip 100 may be temporarily attached to the thermoplastic roofing membrane in straight parallel lines using the adhesive 125 and release liner 130. In operation, the first nozzle 400A and the second nozzle 400B are positioned as shown in FIG. 3B. The first nozzle 400A and the second nozzle 400B preferably drag over the teeth and are long enough that they cover several teeth simultaneously. As the platform guiding device 500 moves along the upstanding central portion 105 of the thermoplastic profile strip 100, jets of hot air from the first nozzle 400A and the second nozzle 400B weld the notches to the thermoplastic roofing membrane 200. The tip 410 may then "smear" the notched teeth out over the heated thermoplastic roofing membrane ensuring a good weld.

While a number of particular embodiments of the present invention have been described herein, it is understood that various changes, additions, modifications, and adaptations may be made without departing from the scope of the present invention, as set forth in the following claims.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A thermoplastic profile roofing strip, comprising
   a horizontal base extending along a horizontal longitudinal direction; and
   a vertical central portion connected to the horizontal base;
   wherein the vertical central portion extends along a vertical longitudinal direction normal to the horizontal longitudinal direction;
   wherein the horizontal base comprises first and second opposed flange portions extending along a horizontal lateral direction that is normal to the vertical longitudinal direction;
   wherein the first and second opposed flange portions of the horizontal base each comprise a notched profile extending along the horizontal longitudinal direction; and
   wherein the first and second opposed flange portions are operable to be heat welded to an underlying roofing membrane.

2. The thermoplastic profile roofing strip of claim 1, wherein the vertical central portion further comprises a hook extending along the horizontal longitudinal direction.

3. The thermoplastic profile roofing strip of claim 2, wherein the hook further comprises a lip coextensive with the hook.

4. The thermoplastic profile roofing strip of claim 2, wherein the hook extends substantially the length of the horizontal base.

5. The thermoplastic profile roofing strip of claim 1, wherein the horizontal base has a width ranging from about 0.5 to about 2 inches.

6. The thermoplastic profile roofing strip of claim 1, wherein the notched profile has a square tooth shape.

7. The thermoplastic profile roofing strip of claim 1, wherein the horizontal base further comprises an adhesive on a surface opposite the vertical central portion.

8. The thermoplastic profile roofing strip of claim 7, wherein the horizontal base further comprises a release liner.

9. The thermoplastic profile roofing strip of claim 1, wherein the vertical central portion has a triangular cross section.

10. The thermoplastic profile roofing strip of claim 1, wherein the vertical central portion has a height ranging from about 1 to about 3 inches.

11. The thermoplastic profile roofing strip of claim 1, wherein the vertical central portion extends substantially along a center line and runs substantially the length of the horizontal longitudinal direction of the horizontal base.

12. The thermoplastic profile roofing strip of claim 1, wherein the notched profiles of the first and second opposed flange portions extend substantially the length of the horizontal base.

* * * * *